(12) United States Patent
Watanabe et al.

(10) Patent No.: US 7,604,286 B2
(45) Date of Patent: Oct. 20, 2009

(54) ROOF STRUCTURE OF A VEHICULAR BODY (75) Inventors: Jun Watanabe, Yamato (JP); Yorimasa Tsubota, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 59 days.

(21) Appl. No.: 11/616,135

(22) Filed: Dec. 26, 2006

(65) Prior Publication Data

US 2007/0176467 A1    Aug. 2, 2007

(30) Foreign Application Priority Data

Jan. 13, 2006    (JP) ............................. 2006-005797

(51) Int. Cl.
  B62D 25/06    (2006.01)
(52) U.S. Cl. .................... 296/210; 296/185.1; 296/1.03
(58) Field of Classification Search ................ 296/210, 296/185.1, 1.03, 30, 203.03, 203.01, 187.13
  See application file for complete search history.

(56) References Cited

U.S. PATENT DOCUMENTS 5,681,076 A * 10/1997 Yoshii ........................ 296/210
6,347,829 B1 * 2/2002 Hanyu ........................ 296/210
6,786,538 B1 * 9/2004 Turk et al. ............. 296/216.01

FOREIGN PATENT DOCUMENTS

| DE | 4005884 | | 8/1991 |
| EP | 178858 A | * | 4/1986 |
| EP | 1149757 A2 | | 10/2001 |
| FR | 35387 | * | 3/1930 |
| JP | 2001-301653 | | 10/2001 |

* cited by examiner

*Primary Examiner*—Glenn Dayoan
*Assistant Examiner*—Melissa A Black
(74) *Attorney, Agent, or Firm*—Young Basile (57) ABSTRACT There is provided a roof structure of a vehicular body. The roof structure includes right and left side roof rails disposed on opposing sides of the vehicular body. The roof structure further includes a plurality of roof reinforcements installed in a spaced-apart relationship between the side roof rails and extending along a lateral direction across the vehicular body and a roof panel attached to the roof reinforcements, wherein at least one roof reinforcement of the plurality of roof reinforcements is a first roof reinforcement having a maximum width portion wider than a closest relative spacing between the first roof reinforcement and an adjacent roof reinforcement of the plurality of roof reinforcements on a first side of the first roof reinforcement.

15 Claims, 8 Drawing Sheets

FIG. 8

ROOF STRUCTURE OF A VEHICULAR BODY

TECHNICAL FIELD

The present invention relates to a roof structure of a vehicular body.

BACKGROUND OF THE INVENTION

A roof reinforcement serves as a roof framework and is mounted on right and left side roof rails along the lateral direction of an automotive vehicle. The roof reinforcement, which has a wide portion at its center, is located between front and rear roof rails (see Japanese Laid-Open Patent Publication No. 2001-301653; hereinafter, "Reference 1").

The roof reinforcement has a reversed hat-shaped cross-section for ensuring the strength and rigidity of a roof panel. A bottom surface of the roof panel is bonded to a flange portion of the roof reinforcement through the use of an adhesive.

In a conventional roof structure in which the roof panel is bonded on the roof reinforcement by an adhesive, a resonance frequency that can significantly deform the framework of the vehicular body is close to a resonance frequency of the roof panel. Further, an amplitude of the roof panel may increase by a resonance between the framework of the vehicular body and the roof panel. When the amplitude of the roof panel vibration increases due to resonance, the noise generated from the roof panel becomes louder and a muffled sound may generate.

The generation of the muffled sound depends on both the resonance of the roof panel and the cavity resonance of a compartment in a vehicle. That is, the muffled sound is generated when the resonance frequency of the roof panel is equal to or greater than a frequency of the cavity resonance. The cavity resonance mainly depends on the size and shape of the compartment. In order to prevent the muffled sound, it is required to reduce the resonance frequency of the roof panel to less than the frequency of the cavity resonance. In other words, the vibration of the roof panel should be restrained.

However, in the roof structure (a vehicular body structure) disclosed in Reference 1, only one roof reinforcement having the wide portion at its center is located on the intermediate portion between the front and rear roof rails and mounted on the right and left side roof rails of a vehicular body. Accordingly, when a range in which the roof reinforcement supports the roof panel is small and the resonance occurs at the vehicular frame (i.e., a body structure) due to the vibration of an engine, etc., it is not possible to effectively restrain the vibration of the roof panel.

BRIEF SUMMARY OF THE INVENTION

There is provided a roof structure of a vehicular body. The roof structure includes right and left side roof rails disposed on opposing sides of the vehicular body. The roof structure further includes a plurality of roof reinforcements installed in a spaced-apart relationship between the side roof rails and extending along a lateral direction across the vehicular body and a roof panel attached to the roof reinforcements, wherein at least one roof reinforcement of the plurality of roof reinforcements is a first roof reinforcement having a maximum width portion wider than a closest relative spacing between the first roof reinforcement and an adjacent roof reinforcement of the plurality of roof reinforcements on a first side of the first roof reinforcement.

In another embodiment a roof structure for a vehicular body is provided with a plurality of transverse roof reinforcements each disposed across the vehicular body and together along a length of the vehicular body in a spaced apart relationship. A first transverse roof reinforcement of the plurality of roof reinforcements has a width that is greater than a spacing between the first transverse roof reinforcement and an adjacent roof reinforcement of the plurality of roof reinforcements on a first side of the first roof reinforcement.

According to the roof structure of the vehicular body constructed in accordance with the present invention, it is possible to broaden a range in which the roof reinforcement supports the roof panel. It is also possible to effectively restrain the vibration of the roof panel when the resonance occurs in a frame of a vehicle due to the vibration of the engine, etc. In this regard, the plurality of roof reinforcements have a greater relative width adjacent a front of the vehicular body than adjacent a rear of the vehicular body and a smaller relative spacing between the plurality of roof reinforcements adjacent the front of the vehicular body than the rear of the vehicular body

BRIEF DESCRIPTION OF THE DRAWINGS

The above object and other features of the present invention will become more apparent from the following description of the preferred embodiments given in conjunction with the accompanying drawings.

DETAILED DESCRIPTION OF THE INVENTION

First Preferred Embodiment

Figure 1A:
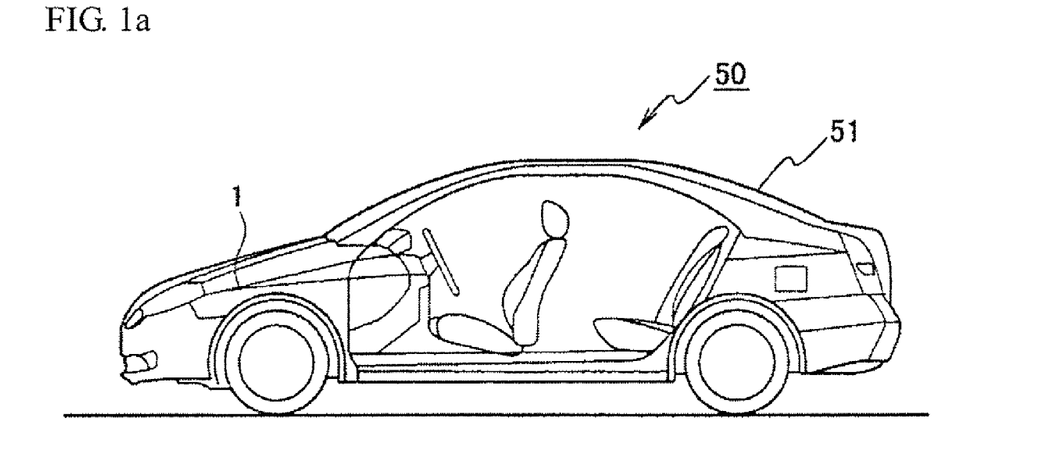
FIG. 1a is a side view of a vehicular body having a roof constructed in accordance with a first preferred embodiment of the present invention.
Figure 1B:
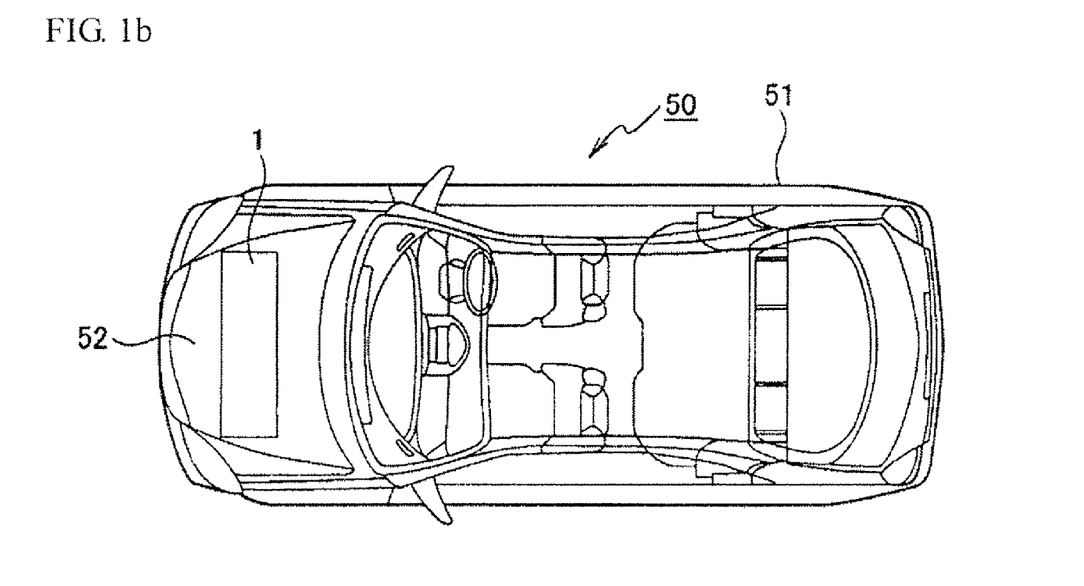
FIG. 1b is a top view of a vehicular body having a roof constructed in accordance with a first preferred embodiment of the present invention.
Figure 2:
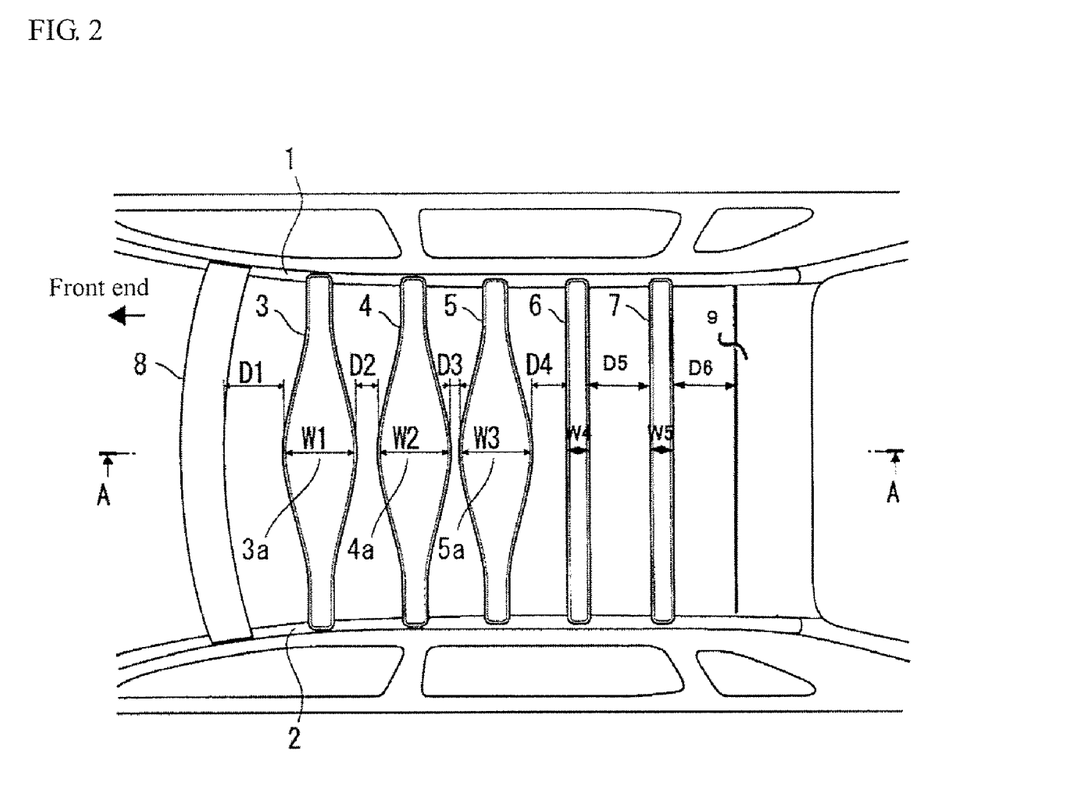
FIG. 2 is a schematic top view of a roof structure of a vehicular body constructed in accordance with a first preferred embodiment of the present invention.
Figure 3:
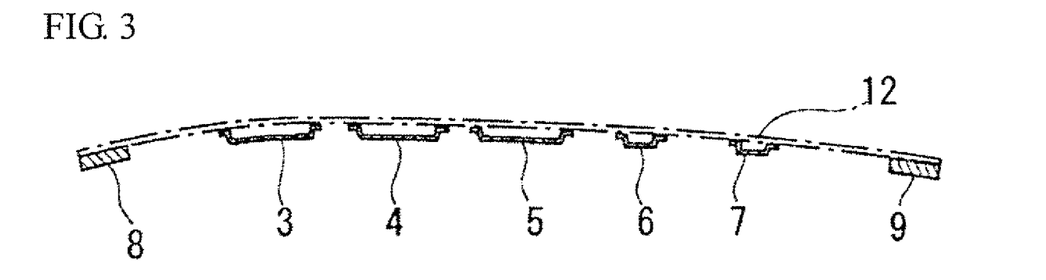
FIG. 3 is a cross-sectional view along the line A-A shown in FIG. 2.

FIGS. 1a and 1b illustrate an external appearance of a vehicular body having an engine as a power source, and show an example of the vehicular body (an automotive vehicle) having a roof structure constructed in accordance with a first preferred embodiment of the present invention. FIG. 2 is a schematic top view showing a roof structure of the vehicular body (automotive vehicle) constructed in accordance with the first preferred embodiment of the present invention. FIG. 3 is a cross-sectional view of FIG. 2 taken along the length of the vehicular body (i.e. along line A-A). Further, the left portion of FIG. 2 shows a front side (end) of the vehicular body, whereas the right portion thereof shows a rear side (end) of the vehicular body.

FIG. 1a is a side view of a vehicular body 50, whereas FIG. 1b is a top view of the vehicular body 50. As shown in FIG. 1b, an engine compartment portion 52 is located in front of the vehicular body 50. The engine compartment portion 52 is formed by welding each dash lower member to each of right and left hood ridges including front side members.

In the vehicular body 50 shown in FIGS. 1a and 1b, an engine 1 is mounted within the engine compartment portion 52. A roof panel 12 is installed at an upper side and occupies approximate half the length of the vehicular body extending from behind the windshield toward the rear end along the front-rear direction of the vehicular body 50.

FIGS. 2 and 3 show a roof reinforcement system including roof reinforcements 3, 4, 5, 6 and 7. As shown in FIGS. 2 and 3, a plurality of roof reinforcements 3, 4, 5, 6 and 7 (five roof reinforcements are shown in FIG. 2) are each placed in the lateral direction, across the vehicular body between side roof rails 1, 2 at right and left sides of the vehicular body. The roof reinforcements are together disposed in a spaced apart parallel relationship, one from each other, at predetermined distances along the front-rear direction of the vehicular body. The roof reinforcements 3, 4, 5, 6, 7 form a succession of roof reinforcements along a length of the vehicular body from front to back wherein at least some successive roof reinforcements have a smaller relative width than preceding roof reinforcements. At least some of the roof reinforcements 3, 4, 5, 6, 7 have a greater relative width adjacent a front of the vehicular body than adjacent a rear of the vehicular body and a smaller relative spacing adjacent the front of the vehicular body than the rear of the vehicular body Both ends of each of the roof reinforcements 3 to 7 are bonded to the side roof rails 1, 2 by spot welding, respectively. Further, a front roof rail 8 and a rear roof rail 9 are bonded to front and rear ends of the side roof rails 1, 2 of the vehicular body along the front-rear direction of the vehicle by spot welding, respectively.

Figure 4:
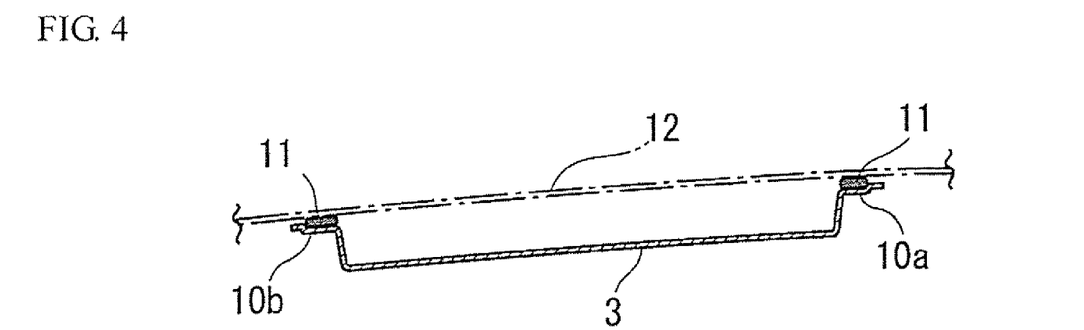
FIG. 4 is an enlarged cross-sectional view of a roof reinforcement placed at the front side wherein a wide portion is formed in accordance with a first preferred embodiment of the present invention.

Each of the roof reinforcements 3 to 7 has an overturned (upside-down) hat shaped cross-section. Flange portions 10a and 10b (see FIG. 4) are formed at both sides (opposing edges) of the roof reinforcements along the longitudinal direction (lateral direction of the vehicle). As shown in FIG. 4, a substantially flat bottom surface of the roof panel 12 is bonded to the flange portions 10a and 10b of each of the roof reinforcements 3 to 7 ( roof reinforcement 3 in FIG. 4) by using an adhesive. Further, an outer periphery (not shown) of the roof panel 12 is welded to the side roof rails 1 and 2, the front roof rail 8 and the rear roof rail 9 by spot welding.

The roof reinforcement system has an expanded portion formed in a central portion along the lateral direction of the vehicular body wherein the expanded portion is arranged on a front side along the front-rear direction of the vehicular body. As shown in FIG. 2, three roof reinforcements 3, 4 and 5, which are arranged closest to the front end (i.e., the engine) and a large curvature portion of the roof panel in a front end of the vehicular body, have widths that increase gradually along a length of the roof reinforcements from both opposing ends to the center thereof.

Further, maximum width portions or parts 3a, 4a and 5a are located at the center of the roof reinforcements 3, 4 and 5. In addition, two roof reinforcements 6, 7 positioned at the rear side do not have wide portions at their center. The roof reinforcements 6, 7 are formed with narrow widths (substantially equal to the width of both ends of the roof reinforcements 3, 4 and 5) extending straight to both ends in a longitudinal direction.

At the center of the roof reinforcements 3, 4, 5, 6, 7 (in the lateral direction) along the length of the vehicular body (right-left direction of the vehicular body shown in FIG. 2), each width of wide portions 3a, 4a and 5a of the roof reinforcements 3, 4 and 5 and narrow portions 6a and 1a of the roof reinforcements 6 and 7 is defined as W1, W2, W3, W4 and W5 (W2>W1=W3>W4=W5), respectively. The spacing between the front roof rail 8 and the wide portion 3a of the roof reinforcement 3 is defined as D1. The closest relative spacing between the wide portion 3a of the roof reinforcement 3 and the wide portion 4a of the roof reinforcement 4 is defined as D2. The spacing between the wide portion 4a of the roof reinforcement 4 and the wide portion 5a of the roof reinforcement 5 is defined as D3. The spacing between the wide portion 5a of the roof reinforcement 5 and the roof reinforcement 6 is defined as D4. The spacing between the narrow portion 6a of the roof reinforcement 6 and the narrow portion 1a of the roof reinforcement 7 is defined as D5. The spacing between the narrow portion 1a of the roof reinforcement 7 and the rear roof rail 9 is defined as D6. Some spacings, such as those with widths D2 and D3 as shown in FIG. 2, have hour-glass shapes with narrow portions at their centers in the lateral direction of the vehicular body as indicated by widths D2 and D3. Additionally, spacings can also be referred to herein as "apertures" or "open areas." Each spacing D1, D2, D3, D4, D5 and D6 is less than widths W1, W2 and W3 of each wide portion 3a, 4a and 5a of the roof reinforcements 3, 4 and 5. In addition, each spacing D1, D2, D3, D4, D5 and D6 is defined to be D1>D5=D6>D4>D2>D3 and the spacings are configured so that W2>(D2=D3) in the first preferred embodiment of the present invention.

The operations and effects of the first preferred embodiment of the present invention will be explained as follows.

According to the roof structure constructed in accordance with the first preferred embodiment, the wide portions 3a, 4a and 5a are formed at the center of three roof reinforcements 3, 4 and 5 positioned at the front end of the vehicular body along the front-rear direction. The roof reinforcements 3, 4 and 5 are close to an engine (the main vibration source) installed at the front end of the vehicular body and are also close to the large curvature portion of the roof panel. Further, the spacing D2 and D3 in each wide portion 3a, 4a and 5a of the roof reinforcements 3, 4 and 5, the spacing D1 between the front roof rail 8 and the wide portion 3a of the roof reinforcement 3, the spacing D4 between the wide portion 5a of the roof reinforcement 5 and the roof reinforcement 6, the spacing D5 between the roof reinforcement 6 and the narrow portion 7a of the roof reinforcement 7 and the spacing D6 between the narrow portion 7a of the roof reinforcement 7 and rear roof rail 9 are defined to be less than the widths W1, W2 and W3 of the wide portions 3a, 4a and 5a. Therefore, it is possible to enlarge the area that is bonded to the roof panel 12 with an adhesive and cover (support) the roof panel 12 and reduce the distance between reinforcements 3, 4, 5, 6, 7. Further, since the wide portions 3a, 4a and 5a (widest portions) are installed at the center of the roof panel 12 along the lateral direction of the vehicle, it is possible to concentrate the load of the roof reinforcements 3, 4 and 5 themselves on the center along the lateral direction of the vehicle. In the first preferred embodiment of the present invention, the wide portions (widest portions) are formed at the center along the lateral direction of the vehicle. Alternatively, it is possible to achieve the same effects even when the wide portions are not provided at the central portion along the lateral direction of the vehicle.

The central portion in the lateral direction of the vehicle refers to a portion ranged between one third and two thirds in the lateral direction (width) of the vehicle. Further, the center in the lateral direction of the vehicle refers to an exact center in the lateral direction of the vehicle.

Accordingly, it is possible to effectively restrain a vibration of the roof panel 12 to thereby reduce the sound from the roof panel, even when the resonance is produced at the frame of the vehicular body due to an engine vibration, etc. Further, it is possible to restrain a propagation of the vibration to an air inside the vehicle by reducing an area of the roof panel 12 exposed to the air inside the vehicle, thereby reducing the sound generation from the roof panel 12.

In addition, it is possible to change a resonance frequency and a vibration characteristic of the roof panel 12, which is bonded to the roof reinforcements, by forming the wide portions 3a, 4a and 5a at the center of the three roof reinforcements 3, 4 and 5 positioned at the front side.

As a result, it is possible to allow the resonance frequency of the roof panel 12 to be farther away from the resonance frequency of the frame of the vehicular body (a body structure). Therefore, the amplitude of the resonance of the roof panel 12 can be effectively reduced, thereby reducing the sound generation of the roof panel 12.

As such, the roof structure constructed in accordance with the first preferred embodiment makes it possible to reduce the sound caused from the roof panel 12, thereby restraining the generation of the muffled sound inside the vehicle.

Second Preferred Embodiment

Figure 5:
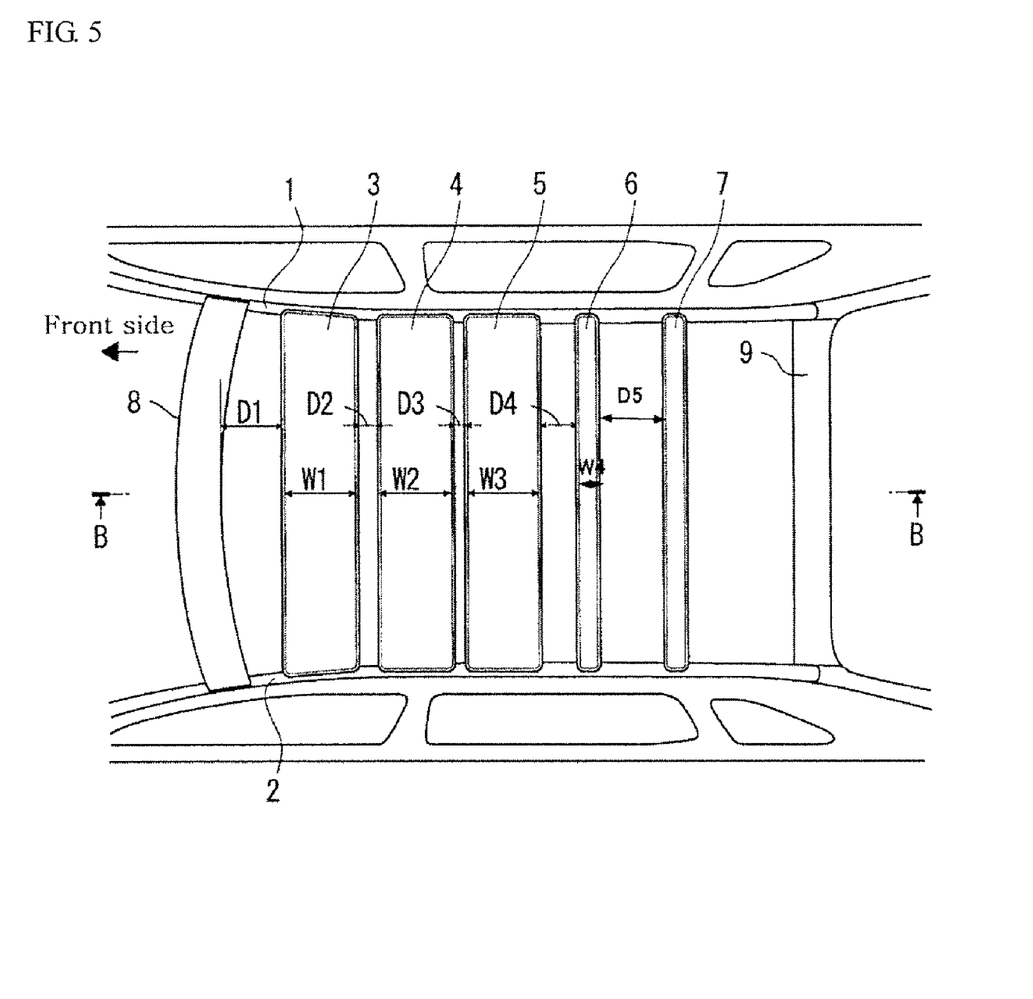
FIG. 5 is a schematic top view showing a roof structure of a vehicular body constructed in accordance with a second preferred embodiment of the present invention.
Figure 6:
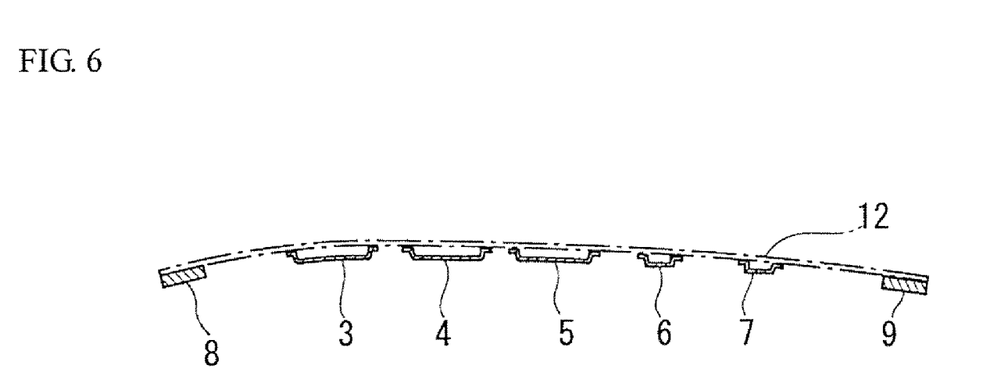
FIG. 6 is a cross-sectional view along the line B-B shown in FIG. 5.

FIG. 5 is a schematic top view showing a roof structure of a vehicular body (an automotive vehicle) constructed in accordance with a second preferred embodiment of the present invention. FIG. 6 is a cross-sectional view of FIG. 5 taken along the line B-B. Further, the left portion of FIG. 5 shows a front end of the vehicular body (an automotive vehicle), whereas the right portion thereof shows a rear end of the vehicular body (an automotive vehicle). Like reference numerals designate like features in the first preferred embodiment of the present invention, and the repetitive explanations thereof will be omitted herein.

In the first preferred embodiment of the present invention, the wide portions are formed at each center of the three roof reinforcements positioned at the front end. In contrast, in the second preferred embodiment of the present invention (as shown in FIGS. 5 and 6), among a plurality of roof reinforcements 3, 4, 5, 6 and 7 (five roof reinforcements in FIG. 4) installed between the side roof rails 1, 2 at the right and left sides of a vehicular body, the widths of three straight roof reinforcements 3, 4 and 5 (which are positioned at the front end along the front-rear direction of the vehicular body and close to a front end (i.e., the engine) and a large curvature portion of the roof panel) are defined to be greater than the widths of two roof reinforcements 6, 7 (which are positioned at the rear end) at the center as well as at both ends in the longitudinal direction.

Further, two reinforcements 6, 7 positioned at the rear end are formed with narrow widths (about one third of the width of wider roof reinforcement 3, 4 and 5) extending straight to both ends in the longitudinal direction. As shown in FIG. 6, a substantially flat bottom surface of the roof panel 12 is bonded to both flange portions of each roof reinforcement 3 to 7 through the use of an adhesive. The other features are similar to those of the first preferred embodiment.

The widths of the roof reinforcements 3, 4 and 5, which are formed with a wider width at the center in the lateral direction of the vehicular body, are defined as W1, W2 and W3 (W2=W1=W3), respectively. The spacing between the front roof rail 8 and the roof reinforcement 3 is defined as D1. The spacing between the roof reinforcement 3 and the roof reinforcement 4 is defined as D2. The spacing between the roof reinforcement 4 and the roof reinforcement 5 is defined as D3. The spacing between the roof reinforcement 5 and the roof reinforcement 6 is defined as D4. Further, the spacing between the narrow portion 6a of the roof reinforcement 6 and the narrow portion 7a of the roof reinforcement 7 is defined as D5. Each spacing D1, D2, D3, D4 and D5 is defined to be less than widths W1, W2 and W3 of the roof reinforcements 3, 4 and 5. In addition, each spacing D1, D2, D3, D4 and D5 are defined so that D1>D5>D4>D2>D3 in the second preferred embodiment of the present invention.

As such, according to the roof structure constructed in accordance with the second preferred embodiment, the widths of three roof reinforcements 3, 4 and 5 positioned at the front end are defined to be greater than the widths of two roof reinforcements 6, 7 positioned at the rear end. Further, the spacing D2, D3 between the roof reinforcements 3, 4 and 5, the spacing D1 between the front roof rail 8 and the roof reinforcement 3, the spacing D4 between the roof reinforcements 5 and the roof reinforcement 6, and the spacing D5 between the narrow portion 6a of the roof reinforcement 6 and the narrow portion 7a of the roof reinforcement 7 are defined to be less than widths W1, W2 and W3 of the roof reinforcements 3, 4 and 5. Therefore, it is possible to enlarge the area that covers (supports) the roof panel 12.

As a result, similar to the first preferred embodiment of the present invention, it is possible to effectively restrain a vibration of the roof panel 12 to thereby reduce the sound generation from the roof panel, even when the resonance is produced at the frame of the vehicular body due to an engine vibration, etc.

Further, it is possible to change a resonance frequency and a vibration characteristic of the roof panel, which is bonded to the roof reinforcements, by widening the width of three roof reinforcements 3, 4 and 5 positioned at the front end.

As a result, it is possible to allow the resonance frequency of the roof panel 12 to be farther away from the resonance frequency of the frame of the vehicular body (a body structure). Therefore, the amplitude of the roof panel 12 can be reduced to thereby reduce the sound generation of the roof panel 12.

According to the roof structure constructed in accordance with the second preferred embodiment of the present invention, it is possible to reduce the sound generation of the roof panel 12 to thereby restrain the generation of the muffled sound inside the vehicle.

Third Preferred Embodiment

Figure 7:
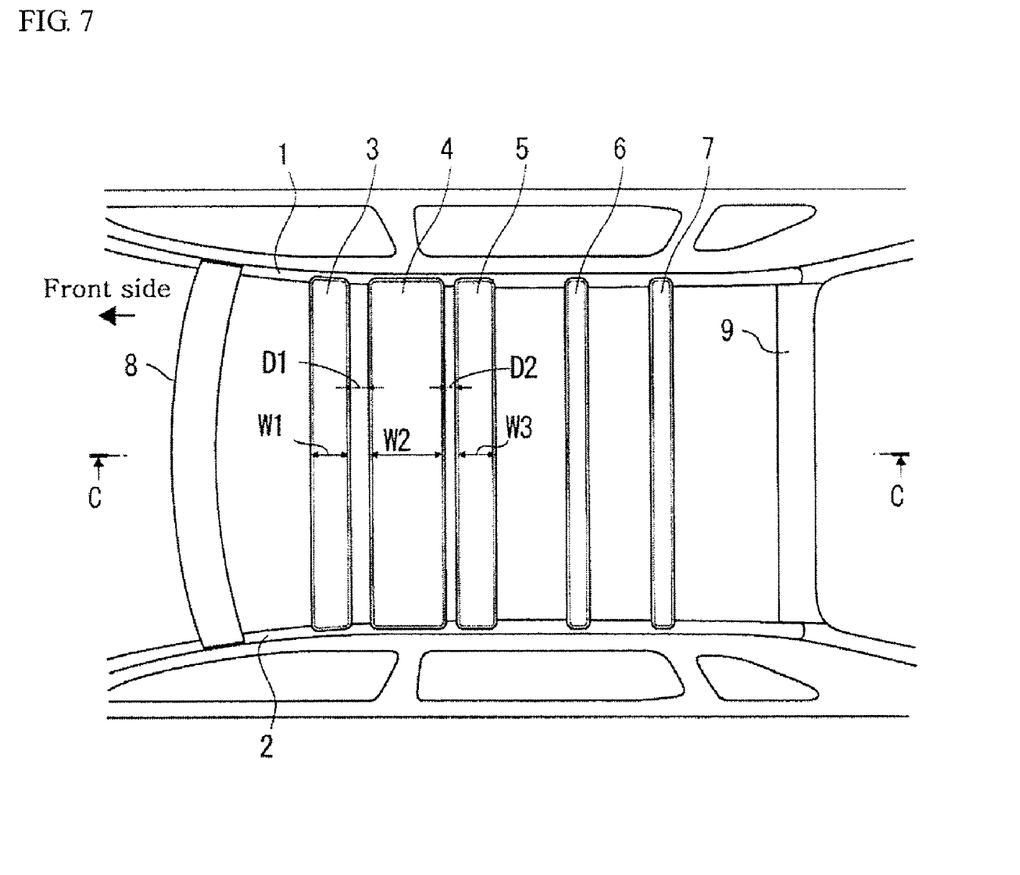
FIG. 7 is a schematic top view showing a roof structure of a vehicular body constructed in accordance with a third preferred embodiment of the present invention.
Figure 8:
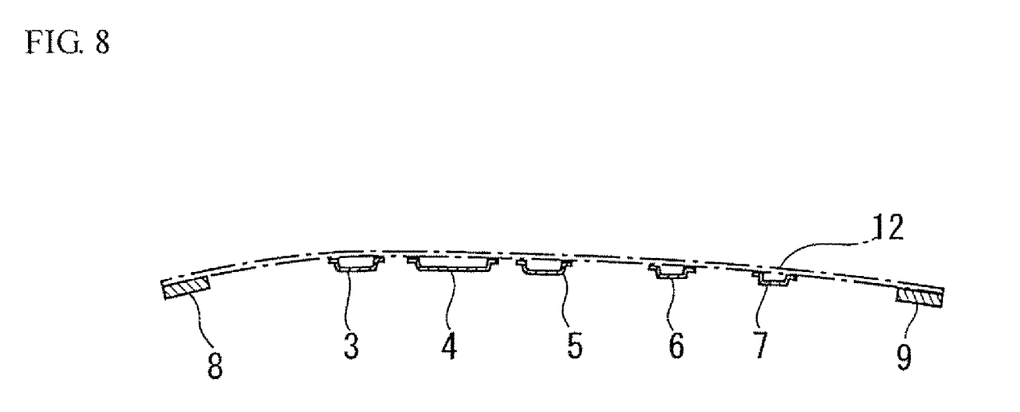
FIG. 8 is a cross-sectional view along the line C-C shown in FIG. 7.

FIG. 7 is a schematic top view showing a roof structure of a vehicular body (an automotive vehicle) constructed in accordance with a third preferred embodiment of the present invention. FIG. 8 is a cross-sectional view of FIG. 7 taken along the line C-C. Further, the left portion of FIG. 7 shows a front end of the vehicular body (an automotive vehicle), while the right portion thereof shows a rear end of the vehicular body (an automotive vehicle). Like reference numerals designate like features in the first and second preferred embodiments of the present invention, and the repetitive explanations thereof will be omitted herein.

In the third preferred embodiment of the present invention (as shown in FIGS. 7 and 8), among a plurality of roof reinforcements 3, 4, 5, 6 and 7 (five reinforcements in FIG. 5)

installed between the side roof rails 1, 2 at the right and left sides of a vehicular body, the widths of three roof reinforcements 3, 4 and 5 (which are positioned at the front end close to an engine installed at the front portion of the vehicular body) are defined to be greater than the widths of two roof reinforcements 6, 7 (which are positioned at the rear end) at the center as well as at both ends in the longitudinal direction. Further, the widths of the roof reinforcements 3, 5 are defined to be slightly narrower than the width of the roof reinforcement 4. Together, roof reinforcements 3, 4, 5 form a group of at least three roof reinforcements with a middle roof reinforcement having a greater relative width than the roof reinforcements on either side. The other features are similar to those of the second preferred embodiment.

Additionally, two reinforcements 6 and 7 positioned at the rear end are formed with narrow widths (one third of the wider roof reinforcement 4) extending straight to both ends in the longitudinal direction. As shown in FIG. 8, a substantially flat bottom surface of the roof panel 12 is bonded to both flange portions of each roof reinforcement 3, 4 and 5 positioned at the front end through the use of an adhesive.

The widths of each roof reinforcement 3, 4 and 5 are defined as $W1$, $W2$ and $W3$ ($W2>W1, W3$), respectively. The spacing between the roof reinforcement 3 and the roof reinforcement 4 is defined as $D1$, whereas the spacing between the roof reinforcement 4 and the roof reinforcement 5 is defined as $D2$. The spacing $D1$, $D2$ are defined to be less than width $W2$ of the roof reinforcement 4 (i.e., $W2>D1, D2$). In addition, the spacing $D1$ is same as or less than the width $W1$ of the roof reinforcement 3 (i.e., $D1 \leq W1$), whereas the spacing $D2$ is same as or less than the width $W3$ of the roof reinforcement 5 (i.e., $D2 \leq W3$).

According to the roof structure constructed in accordance with the third preferred embodiment of the present invention, the widths of the three roof reinforcements 3, 4 and 5 positioned at the front end are defined to be greater than the widths of the two roof reinforcements 6 and 7 positioned at the rear end. Further, the spacing $D1$, $D2$ between the roof reinforcements 3, 4 and 5 are defined to be less than each of width $W1$, $W2$ and $W3$ of the roof reinforcement 3, 4 and 5. Therefore, it is possible to enlarge the area that covers (supports) the roof panel 12.

The third preferred embodiment of the present invention provides the same effects as the first and second preferred embodiments.

Further, in each of the above embodiments of the present invention, although the roof structure of the vehicular body constructed in accordance with the present invention is applied to the roof reinforcement positioned at the front end of the vehicular body, the present invention is not limited to such a feature. Alternatively, the present invention may be applied to the roof reinforcement positioned at the rear of the vehicular body.

While the preferred embodiment of the present invention is described above, the present invention may include other embodiments and modifications without deviating from the subject matter or scope of the present invention.

What is claimed is:

1. A roof structure of a vehicular body, comprising:
   right and left side roof rails disposed on opposing sides of the vehicular body;
   a plurality of roof reinforcements installed in a spaced-apart relationship between the side roof rails and extending along a lateral direction across the vehicular body, said spaced-apart relationship defining through apertures extending continuously from the right side roof rail to the left side roof rail between adjacent roof reinforcements; and
   a roof panel attached to the roof reinforcements, wherein at least one roof reinforcement of the plurality of roof reinforcements is a first roof reinforcement having a maximum width portion wider than the respective through apertures between the first roof reinforcement and two adjacent roof reinforcements of the plurality of roof reinforcements on opposing sides of the first roof reinforcement,
   wherein at least one of the respective though apertures between the first roof reinforcement and the two adjacent roof reinforcements has an hour-glass shape.

2. The roof structure of claim 1, wherein the respective through apertures between the first roof reinforcement and the two adjacent roof reinforcements each have a narrow portion, and wherein the maximum width portion of the first roof reinforcement is wider than a sum of widths of the narrow portions of the respective through apertures on opposite sides of the first roof reinforcement.

3. The roof structure of claim 1, further comprising a plurality of first roof reinforcements successively arranged along a front-to-rear direction of the vehicular body.

4. The roof structure of claim 3, wherein the plurality of successively arranged first roof reinforcements further comprise a succession of at least three, first roof reinforcements in a middle position along a front-to-rear direction of the vehicular body with other roof reinforcements arranged at either end along the front-to-rear direction of the vehicular body, and wherein through apertures between the first roof reinforcements each have an hour-glass shape.

5. The roof structure of claim 3, wherein the maximum width portions of the first roof reinforcements are formed in a central portion along the lateral direction of the vehicular body, and wherein through apertures between the first roof reinforcements each have a narrow portion at the central portion along the lateral direction of the vehicle body.

6. The roof structure of claim 3, wherein the maximum width portions of the first roof reinforcements and the narrow portions of the through apertures between the first roof reinforcements are formed at a center along the lateral direction of the vehicular body.

7. The roof structure of claim 1, wherein the widths of the roof reinforcements other than first roof reinforcements are constant throughout the lateral direction of the vehicular body.

8. The roof structure of claim 1, wherein the roof reinforcements of the plurality of roof reinforcements with a greatest relative width are mounted at the front side of the vehicular body.

9. The roof structure of claim 1, wherein the first roof reinforcements are installed about a vibration source.

10. The roof structure of claim 1, wherein the first roof reinforcements are installed separated from, spaced from, and adjacent to a large curvature portion of the roof panel along the front-to-rear direction of the vehicular body.

11. The roof structure of claim 1, further comprising a second roof reinforcement of the plurality of roof reinforcements having a maximum width portion with a relative value that is smaller than a spacing among adjacent roof reinforcements,
   wherein the number of the first roof reinforcements is three and the first reinforcements are successively arranged at a front side along a front-to-rear direction of the vehicular body, wherein the maximum width portions of all three first roof reinforcements are positioned at centers of the first roof reinforcements along the lateral direction of the vehicular body, wherein two through apertures between the three first roof reinforcements each have an hour-glass shape including a minimum width portion centered along the lateral direction of the vehicular body, wherein the first roof reinforcement having a largest relative maximum width portion among the three first roof reinforcements is disposed at the center along the front-to-rear direction of the vehicular body, wherein the largest relative maximum width portion of the first roof reinforcement are wider than any spacing among all the roof reinforcements, and wherein the number of the second roof reinforcements is two and the second roof reinforcements are arranged on a rear side along the front-rear direction of the vehicular body separated from each other and spaced from each other and from the first roof reinforcements.

12. The roof structure of claim 1 wherein the roof reinforcements further comprises an overturned hat cross section.

13. A roof structure of a vehicular body, comprising:

right and left means for supporting a roof disposed along right and left sides of the vehicular body;

a plurality of means for reinforcing the roof laterally installed in a spaced-apart relationship between the first and second support means, each extending along a lateral direction of the vehicular body, said spaced-apart relationship defining an open area extending continuously from the right supporting means to the left supporting means between adjacent lateral edges of adjacent roof reinforcement means; and a roof panel attached to the roof reinforcement means, wherein at least one roof reinforcement means of the plurality of roof reinforcement means is a first roof reinforcement means having a maximum width portion wider than respective open areas between the first roof reinforcement means and two adjacent roof reinforcements means of the plurality of roof reinforcements means on opposing sides of the first roof reinforcement means, and wherein at least one of the respective open areas between the first roof reinforcement means and the two adjacent roof reinforcements means has an hour-glass shape.

14. A method of forming a roof structure of a vehicular body having right and left side roof rails disposed on opposing sides of the vehicular body, the method comprising:

disposing a plurality of roof reinforcements laterally across the vehicular body between the side roof rails and in a spaced apart relationship along a length of the vehicular body wherein the space apart relationship defines through apertures extending continuously from the right side roof rail to the left side roof rail between adjacent roof reinforcements; and attaching a roof panel to the roof reinforcements, wherein at least one roof reinforcement of the plurality of roof reinforcements is a first roof reinforcement having a maximum width portion wider than respective through apertures between the first roof reinforcement and two adjacent roof reinforcements of the plurality of roof reinforcements on opposing sides of the first roof reinforcement, and wherein at least one of the respective through apertures between the first roof reinforcement and the two adjacent roof reinforcements has an hour-glass shape.

15. A roof structure of a vehicular body comprising:

a plurality of roof reinforcements disposed in a spaced-apart relationship between a pair of opposing side roof rails of the vehicular body, the spaced-apart relationship defining an hour-glass shaped through aperture extending continuously between the pair of opposing side roof rails, wherein the plurality of roof reinforcements have a greater relative width adjacent a front of the vehicular body than adjacent a rear of the vehicular body and a smaller relative spacing between the plurality of roof reinforcements adjacent the front of the vehicular body than the rear of the vehicular body.

* * * * *